US006968558B2

(12) United States Patent
Lee et al.

(10) Patent No.: US 6,968,558 B2
(45) Date of Patent: Nov. 22, 2005

(54) APPARATUS FOR LOADING TRAY OF OPTICAL DISC DRIVE AND OPTICAL DISC DRIVE USING THE SAME

(75) Inventors: Kyu-hyeong Lee, Gyeonggi-do (KR);
Pil-je Cho, Gyeonggi-do (KR);
Chung-ung Kim, Gyeonggi-do (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 230 days.

(21) Appl. No.: 10/400,078

(22) Filed: Mar. 27, 2003

(65) Prior Publication Data

US 2003/0214895 A1 Nov. 20, 2003

(30) Foreign Application Priority Data

May 1, 2002 (KR) .............................. 2002-23943

(51) Int. Cl.[7] ........................................... G11B 17/03
(52) U.S. Cl. .................................................. 720/600
(58) Field of Search ............................. 720/600, 601, 720/607, 610, 615, 622, 641; 369/75.11, 369/75.21, 77.11, 77.21

(56) References Cited

U.S. PATENT DOCUMENTS

| 5,687,145 A | * | 11/1997 | Takashina et al. | 369/30.87 |
| 5,831,956 A | * | 11/1998 | Sawai et al. | 720/600 |
| 5,914,929 A | * | 6/1999 | Kato et al. | 720/656 |
| 6,011,766 A | * | 1/2000 | Nguyen et al. | 720/607 |
| 6,208,605 B1 | * | 3/2001 | Akiba | 720/613 |
| 6,341,114 B1 | * | 1/2002 | Nguyen et al. | 720/654 |
| 6,728,189 B2 | * | 4/2004 | Huang | 720/622 |
| 2003/0117928 A1 | * | 6/2003 | Choi et al. | 369/75.2 |

FOREIGN PATENT DOCUMENTS

KR 2001-38287 5/2001

* cited by examiner

*Primary Examiner*—Allen Cao
(74) *Attorney, Agent, or Firm*—Staas & Halsey LLP

(57) ABSTRACT

A tray loading apparatus of an optical disc drive is provided. The tray loading apparatus includes a main frame, first rails that are installed in the main frame to guide a first tray on which a cartridge accommodating a disc is mounted so that the first tray slides into or out of the main frame, and second rails that are attachable to and detachable from the main frame and guide a second tray on which the disc is placed so that the second tray can slide into or out of the main frame. The tray loading apparatus further includes lockers that lock the second tray when the second tray is completely loaded into the main frame and disc guides that guide the outer circumference of the disc placed on the second tray. Accordingly, second rails can be separated from or coupled to a main frame to selectively load and unload a first tray on which a cartridge is mounted or a second tray on which a disc is placed.

22 Claims, 10 Drawing Sheets

APPARATUS FOR LOADING TRAY OF OPTICAL DISC DRIVE AND OPTICAL DISC DRIVE USING THE SAME

CROSS-REFERENCE TO RELATED APPLICATIONS

This application claims the priority of Korean Patent Application No. 2002-23943 filed on May 1, 2002 in the Korean Intellectual Property Office, the disclosure of which is incorporated herein in its entirety by reference.

BACKGROUND OF THE INVENTION

1. Field of the Invention

The present invention relates to an apparatus for loading a tray of an optical disc drive, and more particularly, to an apparatus for loading a tray of an optical disc drive which may be selectively applicable to a cartridge tray on which a disc cartridge is mounted or a disc tray on which a disc is placed.

2. Description of the Related Art

Optical disc drives record/read data on/from rotating discs by radiating laser beams on recording surfaces of discs that are rotating. Such optical disc drives generally include an apparatus for loading and unloading trays on which discs or cartridges are accommodated.

Hereinafter, a tray on which a cartridge accommodates a disc is referred to as a first tray and a tray on which a disc is placed is referred to as a second tray.

FIG. 1A is an exploded perspective view of a conventional optical disc drive and FIG. 1B is a cross-sectional view taken along line A–A' of FIG. 1A. As shown in FIGS. 1A and 1B, the conventional optical disc drive includes a main frame 100, a first tray 110, a deck 120, and an upper frame 130.

The main frame 100 has first rails 140 which guide the first tray 110 so that the first tray 110 slides into or out of the main frame 100. The first rails 140 protrude inside right and left sidewalls 101 of the main frame 100 so as to contact bottom surfaces 112 of right and left sidewalls 111 of the first tray 110. The main frame 100 includes a loading motor 150 which supplies power necessary for sliding the first tray 110. A first pulley 151 is mounted on a shaft of the loading motor 150 and the rotating power is transmitted to a second pulley 153 having a gear via a belt 152, and then to the pinion gear 160 via an idle gear 154.

A cartridge installing surface 114 on which a cartridge 170 is mounted is formed on the upper surface of the first tray 110 and a rack gear 115 engaging a pinion gear 160 is placed on the lower surface of the first tray 110.

The deck 120 includes a spindle motor 121 which rotates a disc 171 and an optical pickup unit 122 which accesses the disc 171 by sliding in a radial direction of the disc 171. A hub 123, on which the lower surface of the disc 171 is placed when loading the disc 171, is mounted to a shaft of the spindle motor 121. The deck 120 is installed in the main frame 100. The deck 120 rises toward the lower surface of the disc 171 when loading the disc 171 while the deck 120 descends when unloading the disc 171 due to the operation of a cam (not shown) which is driven by the loading motor 150.

The upper frame 130 includes a shutter lever 131 which opens a shutter (not shown) installed in the cartridge 170, a damper 132 which clamps the disc 171 along with the hub 123, and cartridge guides 133 which elastically push the upper surface of the cartridge 170.

FIG. 1C is a plan view of the optical disc drive shown in FIG. 1A. The operation of loading a tray will now be described with reference to FIGS. 1A through 1C. The cartridge 170 is mounted on the cartridge-installing surface 114 of the first tray 110 and the pinion gear 160 actuated by the loading motor 150 which rotates the pinion gear 160. The rotating power of the pinion gear 160 is transmitted to the rack gear 115 of the first tray 110, and thus the first tray 110 starts sliding into the main frame 100.

The lower surfaces 112 of the right and left sidewalls 111 of the first tray 110 contact the upper surfaces 141 of the first rails 140 and the upper surfaces 113 of the right and left sidewalls of the first tray 110 contact the lower surface of the upper frame 130. Thus, the first tray 110 is guided to slide into the main frame 100. The upper surface of the cartridge 170 mounted on the first tray 110 contacts the cartridge guides 133 in the upper frame 130 so that the first tray 110 slides into the main frame 100 without moving up and down.

After the first tray 110 slides to some extent, the shutter (not shown) in the cartridge 170 starts contacting the shutter lever 131 in the upper frame 130. As the first tray 110 continues to slide, the shutter lever 131 completely opens the shutter. Here, the deck 120 ascends due to the operation of the cam (not shown) toward the first tray 110, and thus the spindle motor 121 approaches the disc 171 and the camper 132 in the upper frame 130 descends toward the disc 171. Thus, the lower surface of the disc 171 contacts the hub 123 on the spindle motor 121 and the upper surface of the disc 171 contacts the damper 132 so that the disc 171 is clamped. As a result, in the above-described configuration, it is possible to load the first tray 110 accommodating the cartridge 170 into the main frame 100 and also to unload the first tray 110 out of the main frame 100 by performing the above-described steps in inverse order.

As shown in FIG. 2A, a second tray 200 accommodates the disc 171 and the first tray 110 accommodates the cartridge 170, which can be selectively loaded into the optical disc drive having the above-described structure. Thus, two kinds of optical disc drives can be easily manufactured.

FIG. 2A is a perspective view of the second tray 200 and FIG. 2B is a cross-sectional view of the second tray 200 which is loaded into the optical disc drive shown in FIG. 1A. As shown in FIGS. 2A and 2B, the second tray 200 includes a disc placing surface 211 on which the disc 171 is placed, ribs 220 which are formed on right and left sidewalls of the second tray in a sliding direction, and a rack gear 230. The second tray 200 starts sliding when the pinion gear 160 driven by the loading motor 150 drives the rack gear 230. Here, upper surfaces 221 and lower surfaces 222 of the ribs 220 have to be guided.

If the second tray 200 is installed in the optical disc drive instead of the first tray 110, the upper surfaces 141 of the first rails 140 have to contact the lower surfaces 222 of the ribs 220 of the second tray 200 and the lower surface of the upper frame 130 has to contact the upper surfaces 221 of the ribs 220 so as to guide the sliding of the second tray 200.

However, the first tray 110 has to accommodate the cartridge 170 with the disc 171 to protect the disc 171 from dust or the like. Thus, a width W1 of the first tray 110 is wider than a width W2 of the second tray 200 accommodating the disc 171 and a thickness T1 of the first tray 110 is also thicker than a thickness T2 of the second tray 200. Therefore, as described above, if the second tray 200 is loaded in the optical disc drive, the upper and lower surfaces 221 and 222 of the ribs 220 fail to contact the upper surfaces 141 of the first rails 140 and the lower surface of the upper frame 130. Thus, when the second tray 200 is sliding, the second tray 200 moves up and down. If second rails (not shown) capable of guiding the ribs 220 of the second tray 200 are formed with the first rails 140 in the main frame 100, the first tray 110 interferes with the second rails (not shown) when installing the first tray 110 having greater width and thickness than the second tray 200. Thus, the first tray 110 cannot be loaded.

As a result, when the first tray 110 and the second tray 200 are used, a tray loading apparatus including the main frame 100 has to be additionally manufactured, thereby increasing the cost of the tray loading apparatus.

SUMMARY OF THE INVENTION

Accordingly, the present invention provides an apparatus for selectively loading a first tray or a second tray of an optical disc drive. Additional aspects and advantages of the invention will be set forth in part in the description which follows and, in part, will be obvious from the description, or may be learned by practice of the invention.

According to an aspect of the present invention, an apparatus loading a tray of an optical disc drive includes a main frame, first rails that are installed in the main frame to guide a first tray on which a cartridge accommodating a disc is mounted so that the first tray slides into or out of the main frame, and second rails that are attachable to and detachable from the main frame and guide a second tray on which the disc is placed so that the second tray can slide into or out of the main frame.

According to another aspect of the present invention, an optical disc drive comprises a tray loading apparatus that selectively loads or unloads a first tray on which a cartridge accommodating a disc is placed or a second tray on which the disc is mounted. The tray loading apparatus includes a main frame, first rails that are installed in the main frame to guide the first tray so that the first tray slides into or out of the main frame, and second rails that are attachable to and detachable from the main frame and guide the second tray so that the second tray slides into or out of the main frame.

The tray loading apparatus may further include lockers that lock the second tray when the second tray is completely loaded into the main frame and disc guides that guide the outer circumference of the disc placed on the second tray.

The lockers and the disc guides may form common bodies with the second rails or may be formed of additional parts.

According to still another aspect of the present invention, an apparatus for loading a tray of an optical disc drive includes a main frame, first rails that are installed in the main frame to guide a first tray so that the first tray slides into or out of the main frame, front guides that are attachable to and detachable from the main frame, and each of which includes two first guides that guide a second tray on which a disc is placed so that the second tray slides into or out of the main frame and disc guides that guide the outer circumference of the disc placed on the second tray, and rear guides which are attachable to and detachable from the main frame, and each of which includes the first guide and a pair of elastic arms into which the second tray is elastically inserted.

BRIEF DESCRIPTION OF THE DRAWINGS

These and/or other aspects and advantages of the present invention will become more apparent by describing, in detail, preferred embodiments thereof with reference to the attached drawings in which.

DETAILED DESCRIPTION OF THE PREFERRED EMBODIMENTS

Figure 1A:
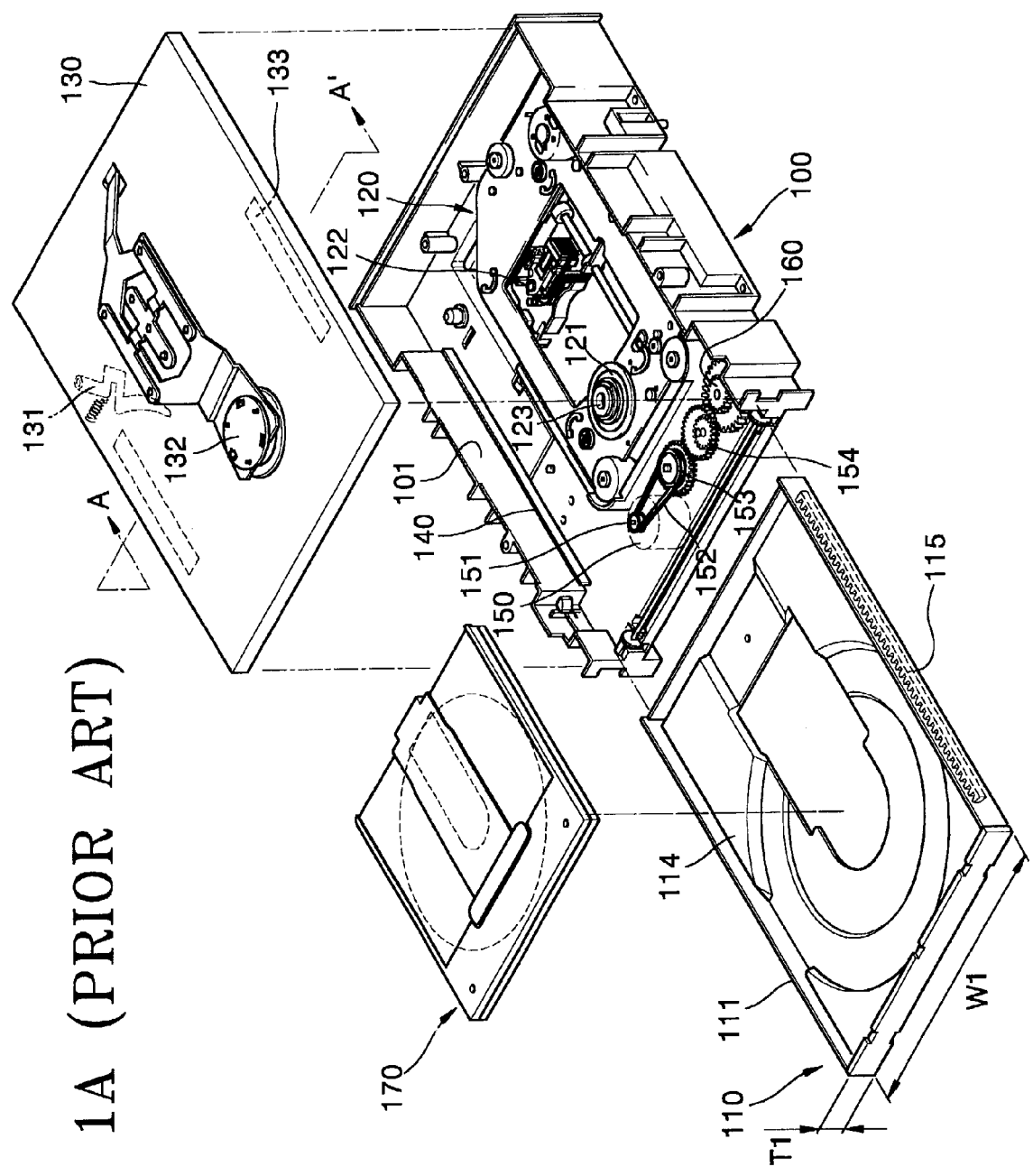
FIG. 1A is an exploded perspective view of a conventional optical disc drive.
Figure 1B:
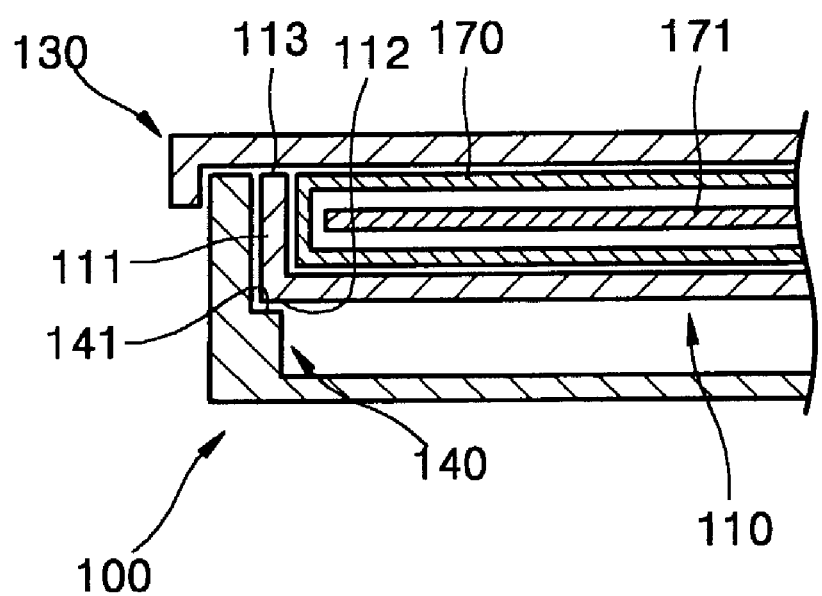
FIG. 1B is a cross-sectional view taken along line A–A' of FIG. 1A.
Figure 1C:
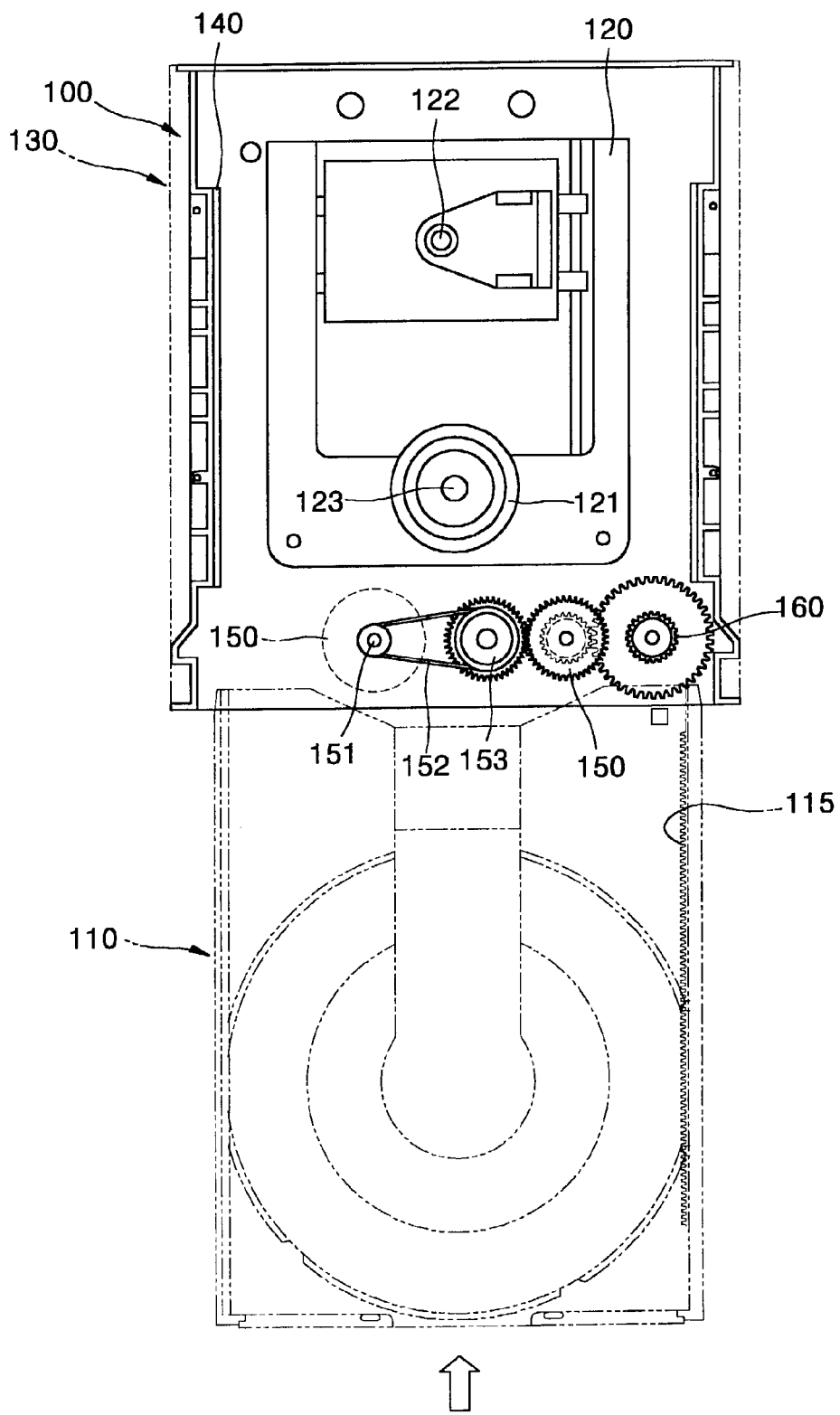
FIG. 1C is a plan view of the optical disc drive shown in FIG. 1A.

Reference will now be made in detail to the present preferred embodiments of the present invention, examples of which are illustrated in the accompanying drawings, wherein like reference numerals refer to the like elements throughout. The embodiments are described below in order to explain the present invention by referring to the figures.

Figure 3A:
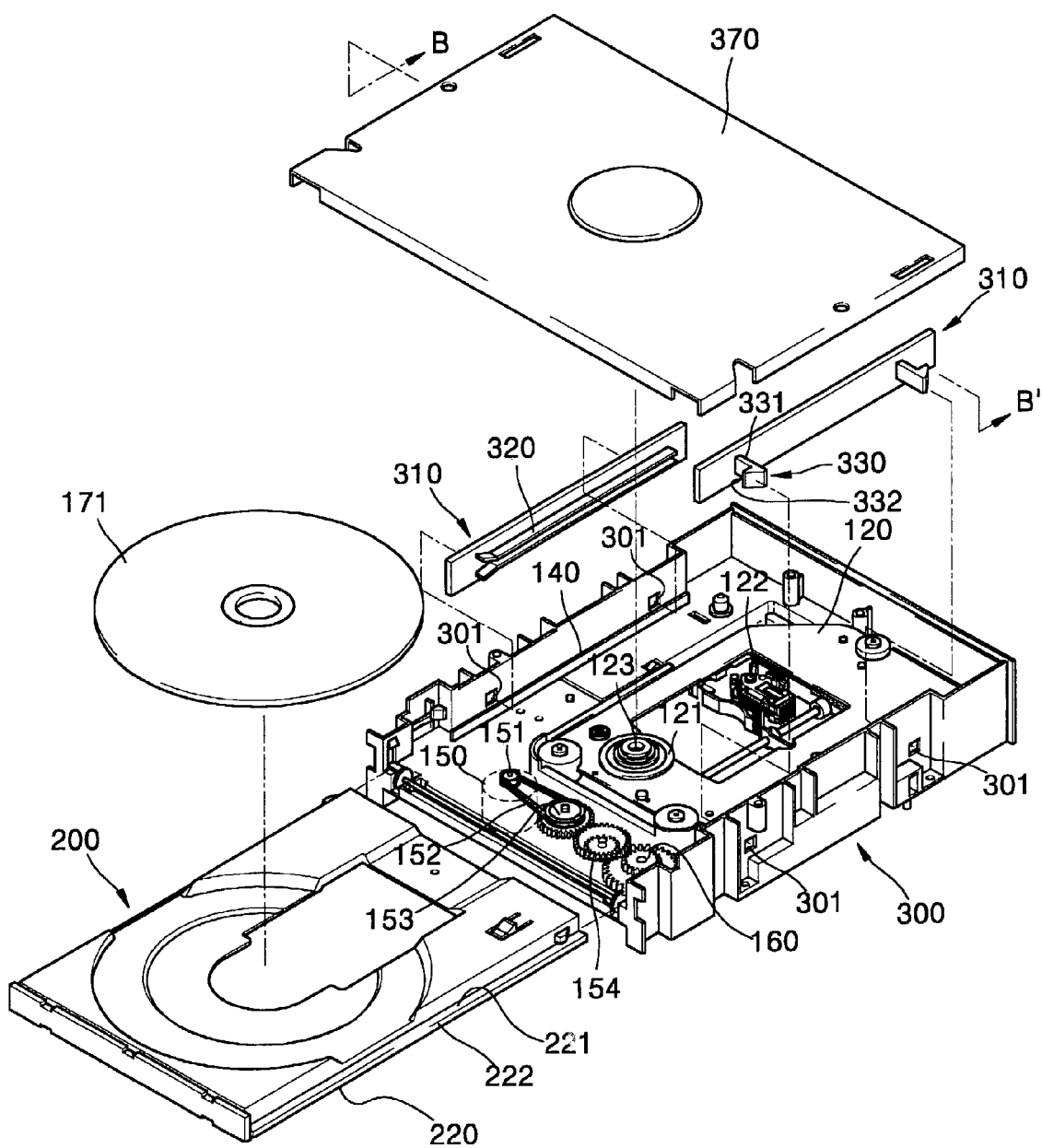
FIG. 3A is an exploded perspective view of an optical disc drive employing a tray loading apparatus according to an embodiment of the present invention.
Figure 3B:
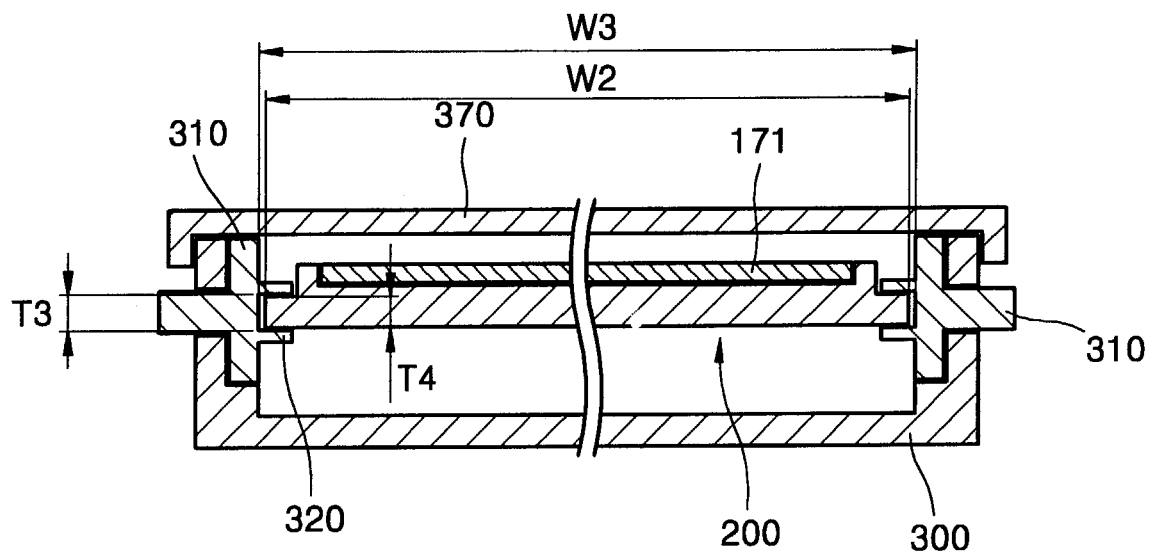
FIG. 3B is a cross-sectional view taken along line B–B' of FIG. 3A.

FIG. 3A is an exploded perspective view of an optical disc drive employing a tray loading apparatus according to an embodiment of the present invention and FIG. 3B is a cross-sectional view taken along line B–B' of FIG. 3A. Referring to FIGS. 3A and 3B, a main frame 300 includes first rails 140, which protrude inside right and left sidewalls of the main frame 300 so as to guide a first tray 110 so that the first tray 110 slides into or out of the main frame 300, a loading motor 150, which supplies power sliding the first tray 110 or a second tray 200, and a pinion gear 160 which is driven by the loading motor 150. Each of the second rails 310 includes two couplers (not shown) which protrude toward the sidewalls of the main frame 300 and rails 320 which are "U"-shaped and guide upper surfaces 221 and lower surfaces 222 of ribs 220 of the second tray 200. Here, distances T3 between upper and lower parts of the rails 320 are slightly greater than thicknesses T4 of the ribs 220 of the second tray 200. Widths W3 of the rails 320 are slightly wider than widths W2 of the second tray 200. The couplers 330 have hook arms 331 which extend from bodies of the second rails 310 to the sidewalls of the main frame 300 and hooks 332 which are formed at ends of the hook arms 331. Through holes 301, which are square-shaped, are formed in two portions of each of the right and left sidewalls of the main frame 300 in order to allow the couplers 330 to fix the second rails 310 to the frame 300.

When the couplers 330 are inserted through the through holes 301, the hooks 332 extending from the hook arms 331 are hooked to the sidewalls of the main frame 300. As a result, the couplers 330 are fixed to the main frame 300. Besides the above-described method, fixing the second rails 310 to the main frame 300 may be achieved using screws.

Also, if the second rails 310 are selectively combined into or separated from the main frame 300, a variety of coupling methods can be used.

When the second rails 310 are installed in the main frame 300, the ribs 220 of the second tray 200 are put between the rails 320 so that the second tray 200 is combined with the main frame 300.

Figure 2A:
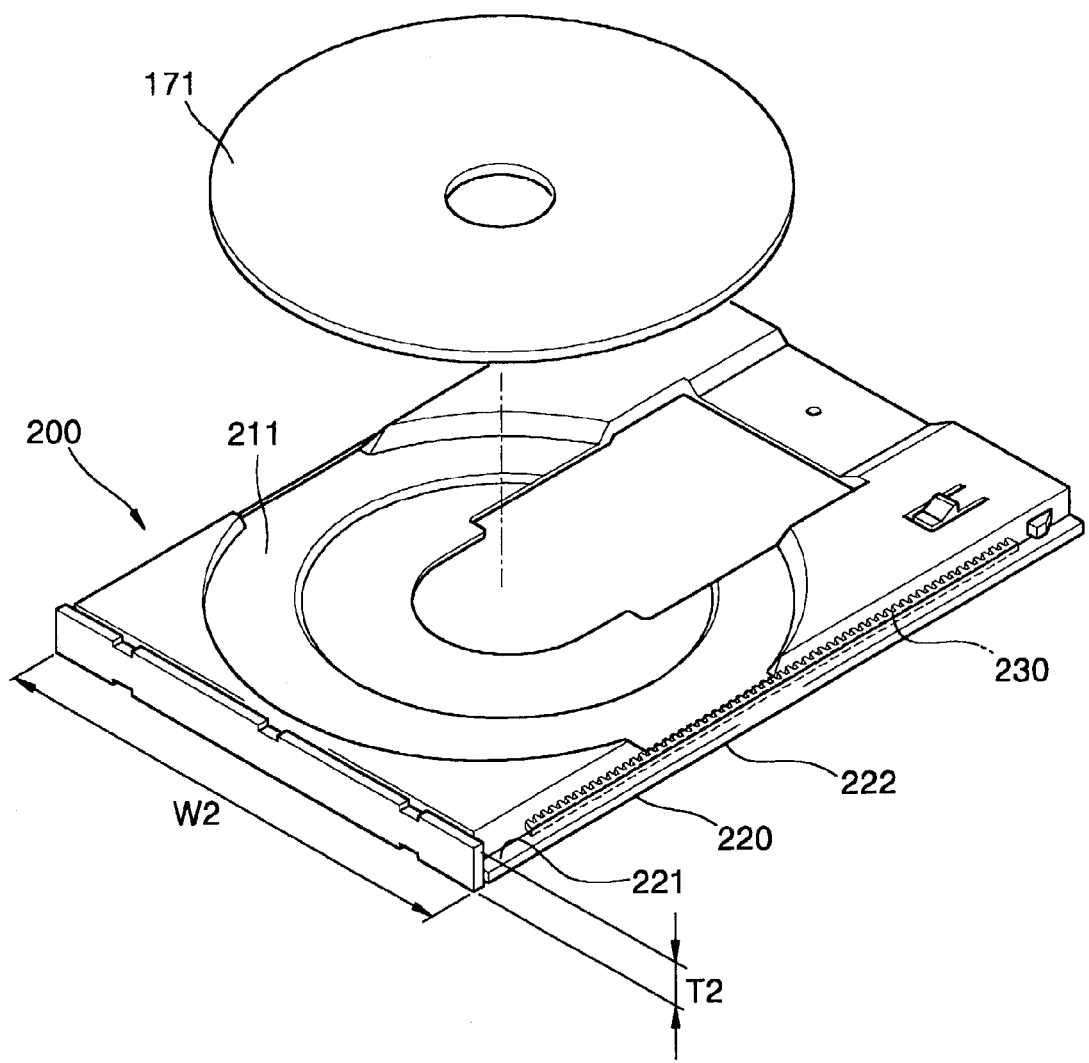
FIG. 2A is a perspective view of a second tray on which a disc is placed.

As described above, after the tray loading apparatus is completed, a disc 171 is placed on a disc placing surface 211 of the second tray 200 and the loading motor 150 starts operating. Then, the loading motor 150 actuates a rack gear 230 (see FIG. 2A) of the second tray 200 via a pinion gear 160 so that the second tray 200 starts sliding into the main frame 300. Here, the ribs 220, which are formed on the right and left sidewalls of the second tray 200, are inserted into the rails 320 of the second rails 310, and thus the second tray 200 can slide into the main frame 300 without moving up and down.

When the second tray 200 slides into the main frame 300 to some extent, and thus a loading operation is almost completed, a deck 120 rises slowly toward the second tray 200 due to the operation of a cam (not shown). Thus, a hub 123, which is mounted on a shaft of a spindle motor 121 installed on the deck 120, is put into a through hole formed in the center of the disc 171, thereby clamping the disc 171. As a result, the loading operation is completed.

According to the above-described structure, the second tray 200 on which the disc 171 is placed can be loaded into the main frame 300 and unloaded out of the main frame 300 by performing the above-described steps in the inverse order.

In general, if the second tray 200 is used, since the hub 123 mounted on the shaft of the spindle motor 121 has a magnet, the disc 171 is clamped by the magnetic force of the magnet. Thus, unlike the prior art, the damper 132 which clamps the disc 171 and the shutter lever 131 which opens the shutter (not shown) of the cartridge 170 are not required. Also, since the rails 320 guide the upper and lower surfaces 221 and 222 of the ribs 220, the cartridge guide 133, which elastically pushes the cartridge 170, is also unnecessary. Therefore, if the shutter lever 131, the damper 132, and the cartridge guides 133 are separated from the upper frame 130 and the upper frame 130 is combined into the main frame 300, an optical disc drive using the second tray 200 can be obtained. For reducing the manufacturing costs, an upper bracket 370 having a simple structure as shown in FIG. 3A may be combined into the main frame 300.

By combining the second rails 310 into the main frame 300, the second tray 200 on which the disc 171 is placed can be loaded into the main frame 300.

In order to load the first tray 110 accommodating the cartridge 170 into the main frame 300, the second rails 310 are separated from the main frame 300, the first tray 110 is loaded into the main frame 300, and the upper frame 130 is combined with the main frame 300. Thus, an optical disc drive using the cartridge 170 can be easily manufactured.

Figure 4A:
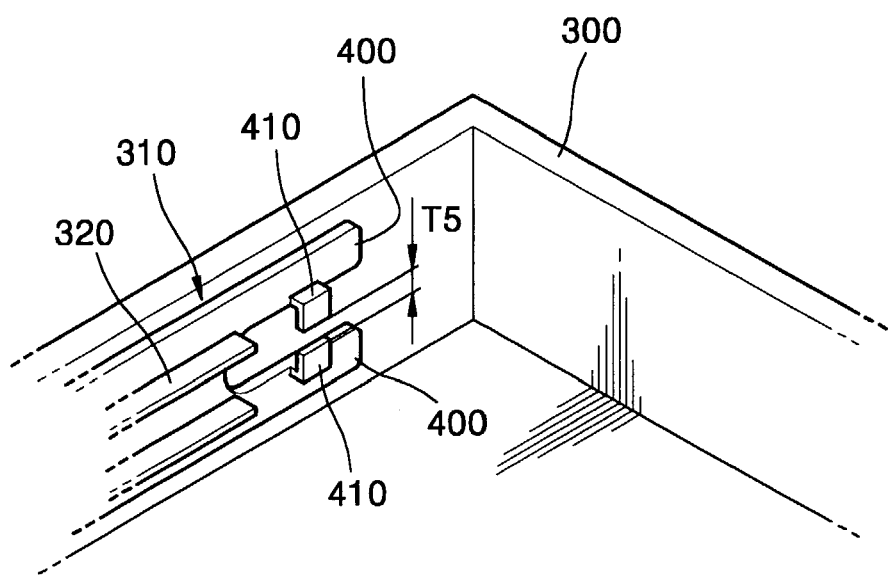
FIG. 4A is a perspective view of lockers according to an embodiment of the present invention.
Figure 4B:
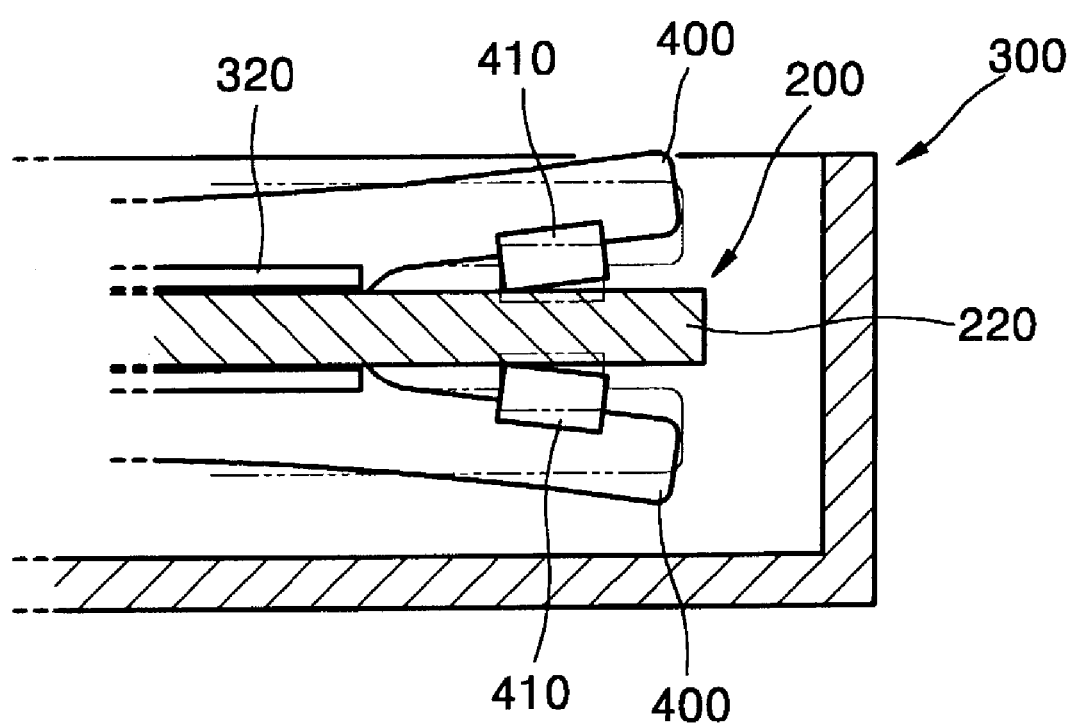
FIG. 4B is a cross-sectional view illustrating a second tray locked to a main frame by the lockers shown in FIG. 4A.

FIG. 4A is a perspective view of lockers according to the present invention and FIG. 4B is a cross-sectional view illustrating a second tray locked to a main frame by the lockers of FIG. 4A. As shown in FIGS. 4A and 4B, the second rails 310 include lockers which lock the second tray 200 to the main frame 300. Each of the lockers has a pair of elastic arms 400 which protrude from the second rails 310 so as to face the second tray 200. Contact parts 410, which contact the ribs 220, are formed at ends of the pair of elastic arms 400. A distance T5 between the contact parts 410 is smaller than a thickness T4 (FIG. 3B) of each of the ribs 220.

It is preferable that the lockers are installed in the rear of the second tray 200 so as not to give excessive load to the second tray 200 when loading the second tray 200.

When the second tray 200 starts sliding into the main frame 300 as a result of the operation of the loading motor 150, and then finishes sliding, the ribs 200 are inserted into the contact parts 410 of the elastic arms 400. Here, the elastic arms 400 are elastically deformed and apply elastic pressures to the upper and lower surfaces of the ribs 220, thereby locking the second tray 200 in its loading position.

It is preferable that the lockers and the second rails 310 form common bodies. Alternatively, the lockers may be formed apart from the second rails 310 and installed on the second rails 310 or in the main frame 300. If the lockers are installed apart from the second rails 310, when the first tray 110 is loaded into the main frame 300, the lockers as well as the second rails 310 have to be separated from the main frame 300.

Figure 5:
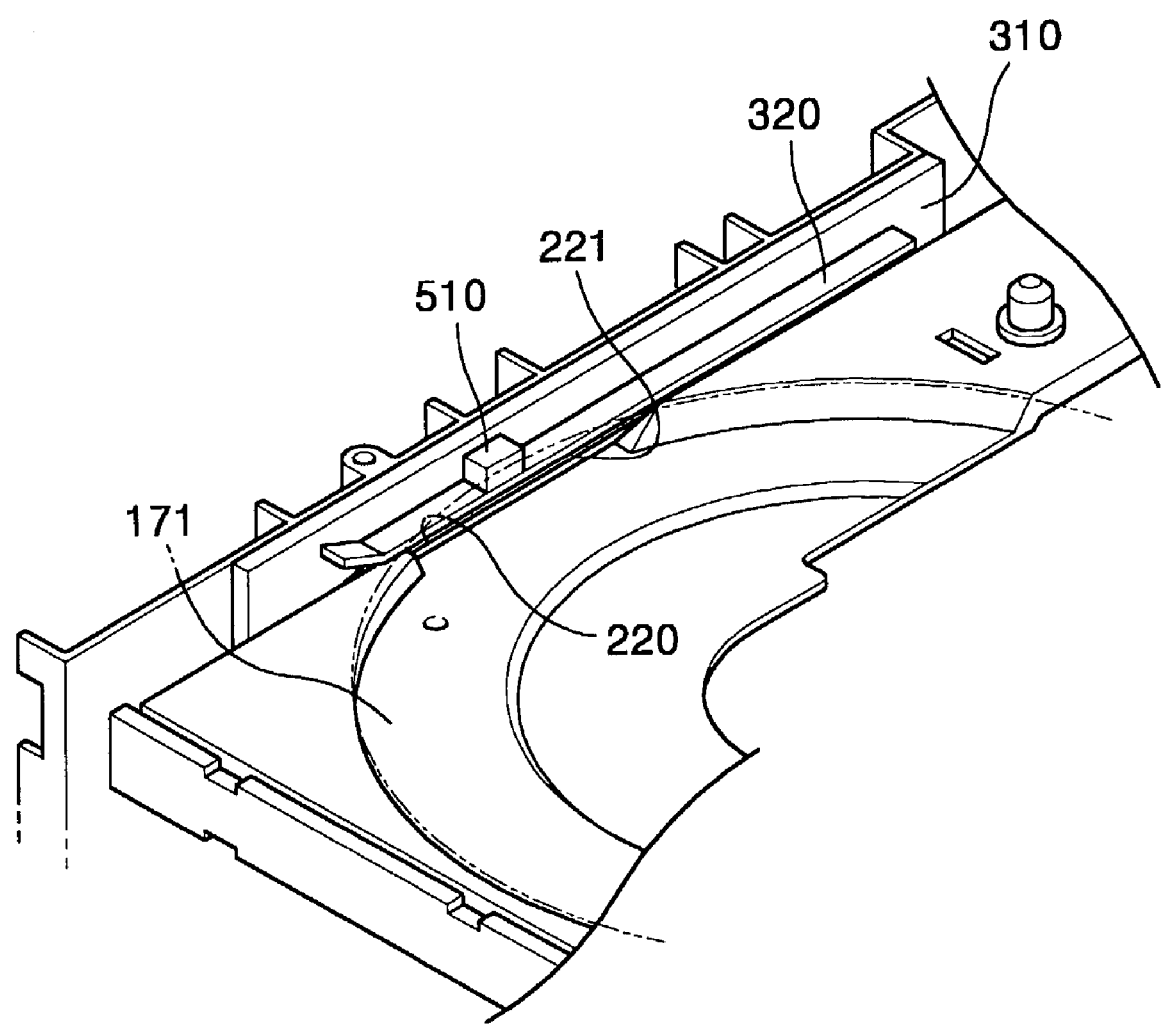
FIG. 5 is a perspective view of disc guides according to an embodiment of the present invention.

FIG. 5 is a perspective view of disc guides according to the present invention. As shown in FIG. 5, the main frame 300 may further include disc guides 510 which guide an outer circumference of the disc 171 placed on the second tray 200.

The disc guides 510 are slightly spaced apart from the upper surfaces 221 of the ribs 220 and protrude from the second rails 310 to be very close to the outer circumference of the disc 171 mounted on the second tray 200 when the second tray 200 is completely loaded into the main frame 300. Alternatively, the disc guides 510 may be manufactured apart from the second rails 310 and combined with the second rails 310 or the main frame 300. However, in this case, when the first tray 110 is loaded into the main frame 300, the disc guides 510 as well as the second rails 310 have to be separated from the main frame 300.

An optical disc drive may be used in a horizontal state as shown in FIG. 3A or in a vertical state. The circumference of the disc placing surface 211 of the second tray 200 is spaced apart from the outer circumference of the disc 171 and greater than the diameter of the disc 171 so as not to contact the disc 171 when the disc 171 is rotating. Thus, if the optical disc drive is used in the vertical state, the disc 171 may move downwards the spaced distance due to its weight. As a result, the center of the disc 171 may deviate from the hub 123 of the spindle motor 121. Thus, the disc guide 510 is formed to support the outer circumference of the disc 171 so that the center of the disc 171 can be prevented from deviating from the hub 123 of the spindle motor 121.

Figure 6:
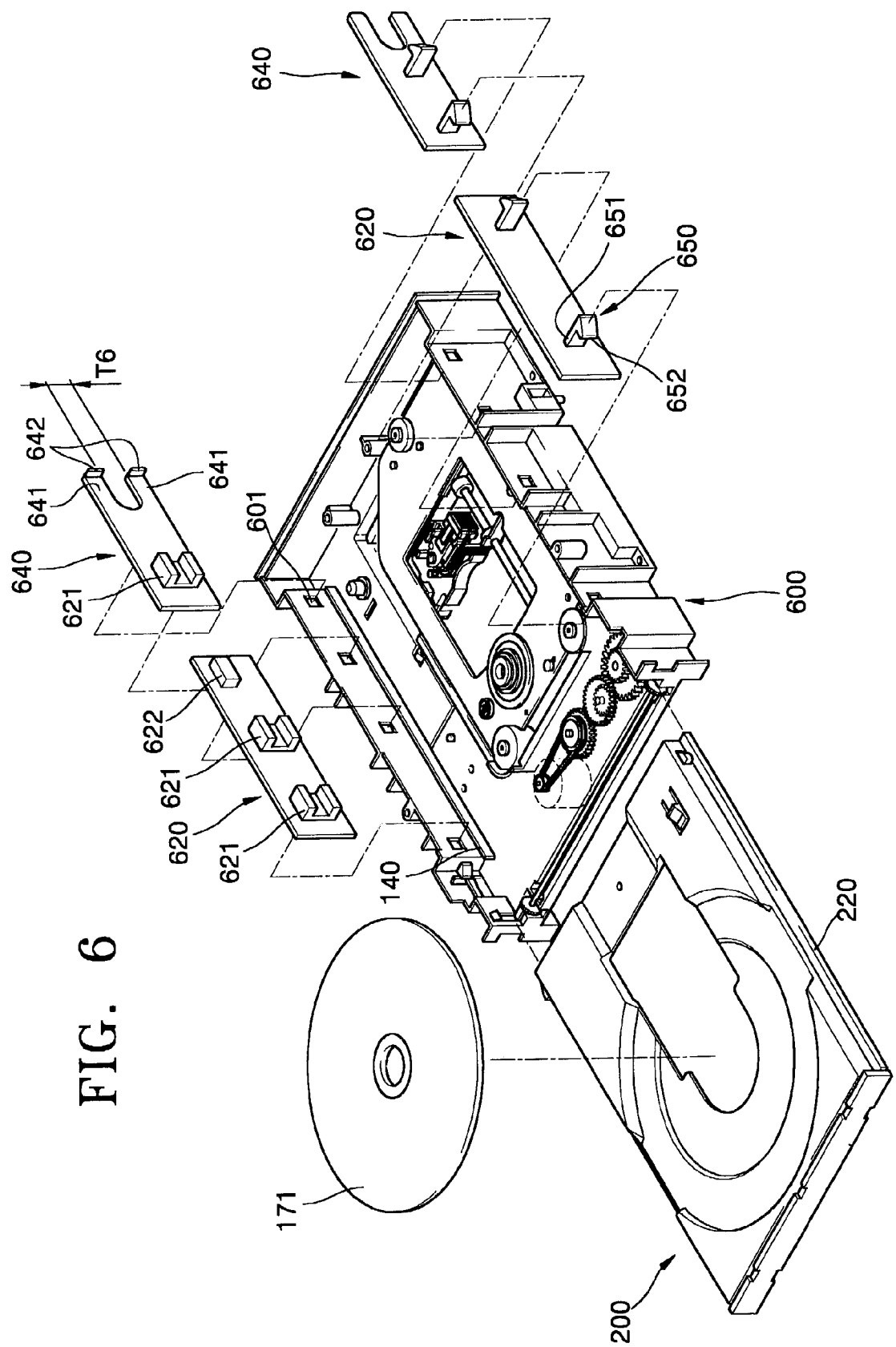
FIG. 6 is an exploded perspective view of a tray loading apparatus according to another embodiment of the present invention.

FIG. 6 is an exploded perspective view of a tray loading apparatus according to another embodiment of the present invention. Referring to FIG. 6, the tray loading apparatus includes a main frame 600, front guides 620, and rear guides 640.

First rails 140 protrude inside right and left sidewalls of the main frame 600 to guide a first tray 110 so as to slide into or out of the main frame 600. Through holes 601 to which the front guides 620 and the rear guides 640 can be coupled are formed in a square shape in four portions of each of the right and left sidewalls of the main frame 600.

Each of the front guides 620 has two first guides 621 which are "U"-shaped and through which ribs 220 of a second tray 200 slide, a disc guide 622 which guides the outer circumference of the disc 171 placed on the second tray 200, and two couplers 650 which are coupled to the main frame 600. The disc guides 622 are positioned above the ribs 220 at predetermined intervals from upper surfaces 221 of the ribs 220 of the second tray 200. The disc guides 622 protrude so as to be very close to the outer circumference of the disc 171 mounted on the second tray 200 when the second tray 200 is completely loaded into the main frame 600.

Figure 2B:
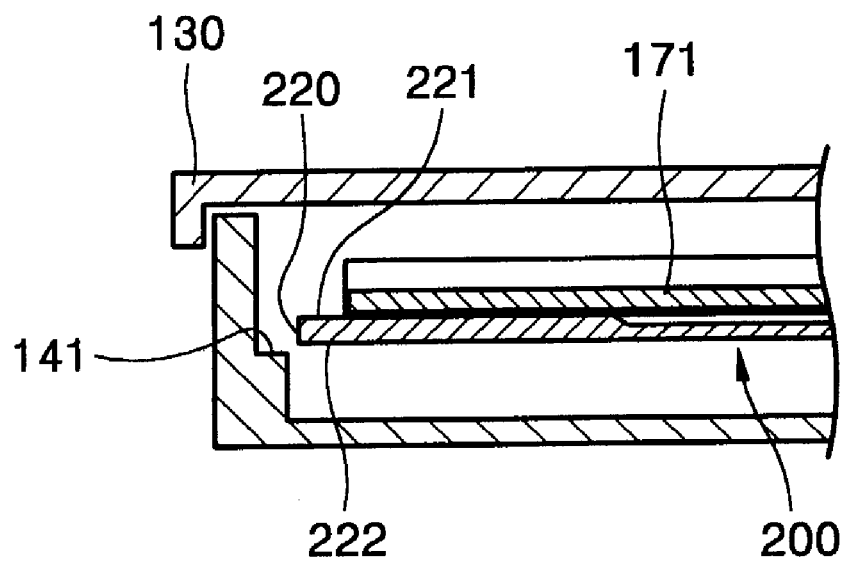
FIG. 2B is a cross-sectional view of the second tray loaded in the optical disc drive shown in FIG. 1A.

Each of the rear guides 640 has a first guide 621 and a pair of elastic arms 641 into which the second tray 200 can be elastically inserted. The elastic arms 641 have contact parts 642 which protrude to the second tray 200 and contact upper surfaces 221 and lower surfaces 222 (shown in FIGS. 2A and 2B) of the ribs 220. Distances T6 between the contact parts 642 are smaller than thicknesses T3 of the ribs 220 formed on the right and left sidewalls of the second tray 200.

Each of the front guides 620 and the rear guides 640 includes two couplers 650 which are coupled to the main frame 600. The couplers 650 have hook arms 651 which extend to the sidewalls of the main frame 600 and hooks 652 which are formed at ends of the hook arms 651.

When the couplers 650 are inserted into through holes 601 formed in the main frame 600, the hooks 652 are hooked to the sidewalls of the main frame 600 so that the front guides 620 and the rear guides 640 are coupled to the main frame 600. Here, the front guides 620 are coupled to front portions of the right and left sidewalls of the main frame 600 and the rear guides 640 are coupled to rear portions of the right and left sidewalls of the main frame 600.

The operation of loading the second tray 200 into the main frame 600 will now be described. When the second tray 200 slides out of the optical disc drive to place the disc 171 thereon, the ribs 220 of the second tray 200 are inserted into the first guides 641 of the front guides 640. Thus, the second tray 200 is supported at four positions.

When the disc 171 is mounted on the second tray 200 and the loading motor 150 is rotated, the loading motor 150 actuates the rack gear 230 (see FIG. 2A) via the pinion gear 160. Then, the second tray 200 starts sliding into the main frame 600. As the second tray 200 slides into the main frame 600, the deck 120 goes up due to the operation of the cam (not shown) and the hub 123 of the spindle motor 121 is coupled to the center of the disc 171. The ribs 220 of the second tray 200 are inserted between the contact parts 642 via the first guides 621 of the rear guides 640 and are locked by elastic forces of the elastic arms 641. As a result, the loading of the second tray 200 into the main frame 600 is completed.

When the optical disc drive is used in the vertical state, the disc guides 642 guide the outer circumference of the disc 171 in loading so as to prevent the center of the disc 171 from deviating from the center of the spindle motor 121.

Using the above-described structure, it is possible to load the second tray 200 on which the disc 171 is mounted into the main frame 600. If the first tray 110 accommodating the cartridge 170 is loaded into the main frame 600, the front guides 620 and the rear guides 640 should be separated from the main frame 600.

As described above, in a tray loading apparatus of an optical disc drive according to the present invention, second rails or front guides and rear guides can be coupled to or separated from a main frame to selectively load a tray accommodating a disc or a tray accommodating a cartridge. In these cases, since a main frame can be used for both trays, manufacturing costs can be reduced.

In addition to the implementations described above, other types of loading tray apparatuses may be used to adapt an optical disk player to accommodate loading trays having different dimensions. For example, the apparatus may comprise a body having a first side and a second side, a projection on the first side configured to receive a first loading tray, and a coupler on the second side removably mountable to the main frame. The coupler is mounted to the main frame to slideably install the first loading tray and the coupler is removed from the main frame to slideably install a second loading tray having larger dimensions than the first loading tray.

While the present invention has been particularly shown and described with reference to preferred embodiments thereof, it will be understood by those of ordinary skill in the art that various changes in form and details may be made therein without departing from the spirit and scope of the present invention as defined by the following claims.

What is claimed is:

1. An apparatus, loadable with each of a plurality of different trays, loading one of the plurality of trays into a main frame of an optical disc drive, the apparatus configured to comprise:
   first rails in the main frame configured to guide a first tray, as the one tray, on which a cartridge accommodating a disc is mounted so that the first tray slides into or out of the main frame; and
   second rails, attachable to and detachable from the main frame, to guide a second tray, as the one tray, on which another disc is placed so that the second tray slides into or out of the main frame, when the apparatus is arranged to load the second tray.

2. The apparatus of claim 1, further comprising lockers to lock the second tray when the second tray is completely loaded into the main frame, when the apparatus is arranged to load the second tray.

3. The apparatus of claim 2, wherein the lockers comprise pairs of elastic arms in which the second tray is elastically inserted and form common bodies with the second rails.

4. The apparatus of claim 1, further comprising disc guides to guide an outer circumference of the other disc placed on the second tray, when the tray loading apparatus is arranged to load the second tray.

5. The apparatus of claim 4, wherein the disc guides form common bodies with the second rails.

6. An apparatus, loadable for each of a plurality of different trays, to load one of the plurality of trays into a main frame of an optical disc drive, the apparatus configured to comprise:
   first rails in the main frame configured to guide a first tray, as the one tray, so that the first tray slides into or out of the main frame;
   front guides, attachable to and detachable from the main frame, with each front guide including two first guides to guide a second tray, as the one tray, on which another disc is placed so that the second tray slides into or out of the main frame and disc guides to guide an outer circumference of the other disc, when the apparatus is arranged to load the second tray; and
   rear guides, attachable to and detachable from the main frame, with each rear guide including a first guide, of the two first guides, and a pair of elastic arms into which the second tray is elastically inserted, when the apparatus is arranged to load the second tray.

7. An optical disc drive, configured to comprise:
   a main frame;
   a tray loading apparatus selectively loading and/or unloading each of a plurality of different trays, to load one of the plurality of trays into the main frame with the one tray being at least one of a first tray on which a cartridge accommodating a disc is placed and a second tray on which another disc is mounted, wherein the tray loading apparatus configured to comprise:

first rails in the main frame configured to guide the first tray so that the first tray slides into or out of the main frame; and second rails, attachable to and detachable from the main frame, to guide the second tray so that the second tray slides into or out of the main frame, when the tray loading apparatus is arranged to load the second tray.

8. The optical disc drive of claim 7, wherein the tray loading apparatus further comprises lockers that lock the second tray when the second tray is completely loaded into the main frame, when the tray loading apparatus is arranged to load the second tray.

9. The optical disc drive of claim 8, wherein the lockers comprise a pair of elastic arms into which the second tray is inserted and form common bodies with the second rails.

10. The optical disc drive of claim 7, wherein the tray loading apparatus further comprises disc guides to guide an outer circumference of the other disc placed on the second tray, when the tray loading apparatus is arranged to load the second tray.

11. The optical disc drive of claim 10, wherein the disc guides form common bodies with the second rails.

12. An optical disc drive, configured to comprise:
a main frame;
a tray loading apparatus selectively loading and/or unloading each of a plurality of different trays, to load one of the plurality of trays into the main frame, with the one tray being at least one of a first tray on which a cartridge accommodating a disc is placed and a second tray on which another disc is placed, wherein the tray loading apparatus comprises:
first rails in the main frame configured to guide the first tray so that the first tray slides into or out of the main frame;
front guides, attachable to and detachable from the main frame, with each front guide including two first guides that guide the second tray so that the second tray slides into or out of the main frame and disc guides that guide an outer circumference of the other disc mounted on the second tray, when the tray loading apparatus is arranged to load the second tray; and
rear guides, attachable to and detachable from the main frame, with each rear guide including a first guide, of the two first guides, and a pair of elastic arms into which the second tray is elastically inserted, when the tray loading apparatus is arranged to load the second tray.

13. An apparatus in a main frame accommodating one of a plurality of trays, each having different dimensions, into the main frame of an optical disc drive, configured to comprise:
a projection configured to receive a first tray;
a coupler removably mountable in the main frame, to slideably install the second tray, when the apparatus is arranged to load the second tray, while when the apparatus is arranged to load the first tray the coupler is not accordingly mounted in the main frame so that the first tray can be slideably installed, with the first loading tray having larger dimensions than the second loading tray.

14. The apparatus of claim 13, wherein the apparatus comprises a rail seatable on a first rail, as the projection, in the main frame, wherein the seatable rail is a portion of the coupler.

15. The apparatus of claim 13, wherein the projection comprises a u-shaped rail.

16. The apparatus of claim 13, wherein the projection comprises a guide.

17. The apparatus of claim 13, further comprising disc guides to guide an outer circumference of a disc placed on the second tray.

18. The apparatus of claim 13, wherein the apparatus further comprises:
a front guide attachable to and detachable from the main frame, each front guide including two first guides to guide the second tray so that the second tray slides into or out of the main frame; and
rear guides attachable to and detachable from the main frame, each rear guide including a first guide, of the two first guides, and a pair of elastic arms, wherein the second tray is elastically inserted into the elastic arms.

19. The apparatus of claim 13, wherein the coupler comprises hooks at ends of hook arms insertable within holes in the main frame.

20. The apparatus of claim 13, wherein a disc in the second loading tray is clamped by a magnetic force of a magnet.

21. An optical drive for receiving a first loading tray and a second loading tray, configured to comprise:
a main frame configured to receive the first loading tray;
a coupler removeably mountable to the main frame, the coupler being installed in the main frame to configure the main frame to receive the second loading tray, such that upon removal of the coupler in the main frame the main frame is again configured to receive the first loading tray;
a deck in the main frame slowly riseable toward the first loading tray or the second loading tray, the deck comprising:
a spindle motor installed on the deck and having a shaft;
a hub having a magnet mounted to the shaft, the hub being insertable into a through hole in a center of a disc in the first or second loading trays, wherein the disc is clamped by a magnetic force of the magnet.

22. The apparatus of claim 1, wherein the disc is different from the other disc.

* * * * *